(12) United States Patent
Partridge

(10) Patent No.: US 7,931,251 B2
(45) Date of Patent: Apr. 26, 2011

(54) EXPANDING GATE VALVE

(75) Inventor: Charles C. Partridge, Houston, TX (US)

(73) Assignee: Perdix Engineering LLC, Houston, TX (US)

( * ) Notice: Subject to any disclaimer, the term of this patent is extended or adjusted under 35 U.S.C. 154(b) by 156 days.

(21) Appl. No.: 12/459,814

(22) Filed: Jul. 8, 2009

(65) Prior Publication Data
US 2011/0005599 A1    Jan. 13, 2011

(51) Int. Cl.
F16K 25/00    (2006.01)
(52) U.S. Cl. ......... 251/167; 251/187; 251/200; 251/204
(58) Field of Classification Search .................. 251/167, 251/168, 187, 195–200, 202, 203–204
See application file for complete search history.

(56) References Cited

U.S. PATENT DOCUMENTS

| 608,681 | A | * | 8/1898 | Hyde | 251/167 |
|---|---|---|---|---|---|
| 2,148,628 | A | | 2/1939 | Laurent | |
| 2,161,175 | A | | 6/1939 | Laurent | |
| 2,502,689 | A | * | 4/1950 | Yant | 251/167 |
| 2,541,968 | A | | 2/1951 | Laurent | |
| 2,826,391 | A | * | 3/1958 | Bredtschneider | 251/167 |
| 2,861,770 | A | * | 11/1958 | Bredtschneider | 251/167 |
| 2,865,597 | A | * | 12/1958 | Lucas | 251/187 |
| 2,954,960 | A | | 10/1960 | Dunbar et al. | |
| 2,991,042 | A | | 7/1961 | Natho | |
| 3,212,516 | A | | 10/1965 | Natho | |
| 3,252,472 | A | | 5/1966 | Natho | |
| 3,534,764 | A | | 10/1970 | Natho | |
| 3,743,244 | A | * | 7/1973 | Dickenson et al. | 251/197 |
| 4,258,743 | A | | 3/1981 | Dare et al. | |
| 4,262,690 | A | | 4/1981 | Binegar et al. | |
| 4,301,993 | A | * | 11/1981 | Waller | 251/167 |
| 4,313,458 | A | | 2/1982 | Burns et al. | |
| 4,379,557 | A | | 4/1983 | Saka | |
| 4,393,889 | A | | 7/1983 | Binegar et al. | |
| 4,495,966 | A | * | 1/1985 | Longamore | 251/199 |
| 4,560,141 | A | * | 12/1985 | Bosch | 251/167 |
| 4,573,660 | A | * | 3/1986 | Husted | 251/195 |
| 5,083,582 | A | | 1/1992 | Lawson | |
| 5,094,270 | A | | 3/1992 | Reimert | |
| 5,158,264 | A | * | 10/1992 | Le et al. | 251/198 |
| 5,269,491 | A | * | 12/1993 | Reynolds | 251/195 |
| 5,722,636 | A | | 3/1998 | Houston | |
| 5,743,288 | A | | 4/1998 | Mosman et al. | |
| 6,164,622 | A | | 12/2000 | Partridge | |
| 6,612,546 | B2 | * | 9/2003 | Young et al. | 251/195 |

* cited by examiner

*Primary Examiner* — John Bastianelli
(74) *Attorney, Agent, or Firm* — James L. Jackson

(57) ABSTRACT

An expanding gate valve having a valve body defining a valve chamber and flow passages and having spaced sealing surfaces. Gate members are moveable within the valve body between open and closed positions and at the closed position having sealing engagement with the spaced sealing surfaces. A wedge member is positioned between the gate members and has at least one tapered surface having reacting engagement with a tapered surface of one of the gate members so that relative linear movement of the gate member relative to the tapered surface of the wedge member develops a lateral gate expansion force causing expansion of the gate members for tight sealing engagement with the spaced sealing surfaces. A valve stem is linearly moveable to valve opening and closing positions within said valve body and has driving connection with the gate members Upon initial linear opening movement the valve stem causes sequential opening movement of the gate members prior to initial opening movement of said first gate member and releases the sealing force of the upstream gate member to minimize the force that is required for opening for the valve.

8 Claims, 4 Drawing Sheets

EXPANDING GATE VALVE

BACKGROUND OF THE INVENTION

1. Field of the Invention

The present invention generally concerns expanding gate valves and more particularly concerns expanding gate valves having gate and gate expansion components that can be more easily opened and closed as compared with more conventional expanding gate valve mechanisms. More particularly, the present invention concerns a valve mechanism having a pair of gate members and a valve stem arrangement that permits sequential initial opening movement of one of the gate members prior to initial opening movement of the other gate member to ensure opening of the expanding gate assembly by application of minimal force. This invention also concerns an expanding gate valve mechanism having upstream and downstream gate members and a gate expansion wedge for gate expansion and having a gate actuator mechanism ensuring initial opening movement of the upstream gate member prior to initiation of opening movement of the downstream gate member. The present invention concerns an expanding gate valve mechanism that effectively prevents the occurrence of the well-known problem of back-wedging or premature expansion of an expanding gate assembly during linear closing movement thereof.

2. Description of the Prior Art

One popular type of expanding gate valves were initially developed by Milton P. Laurent in the mid-1930's, with U.S. Pat. No. 2,148,628 being issued to Laurent in early 1939. This particular type of expanding gate valve has been quite popular in the petroleum and other similar industries where efficient and effective control of high pressure fluids is required. The expanding gate assemblies of these types of expanding gate valves generally comprise a pair of gate members each having flat sealing surfaces for sealing with spaced seat surfaces within the valve and each having an angular gate expansion face. Typically, only one of the gate members is directly driven be a valve stem, while the other gate member is somewhat free floating and is moved along with the driven gate member. When the linear travel of the floating gate member is stopped by an internal stop surface or stop member within the valve body the stem driven gate member is further linearly moved by a gate actuator mechanism. This relative linear movement of the gate members causes camming interaction of the angular faces of the gate members, thus causing lateral expansion movement of the gate members, resulting in forcible movement of the gate members into sealing engagement with internal seat surfaces within the valve body. Increase of the closing force of the valve stem achieves corresponding increase of the sealing force of the gate members with the internal seat surfaces within the valve body.

A principal disadvantage of conventional expanding gate valves is that the gate and gate expansion geometry often fail to permit significant collapse of the gate mechanism during gate unsealing and opening movement. This condition causes the gate members to slide along the seat surfaces within the valve during valve opening movement, causing significant wear and erosion of the seat surfaces or seat assemblies as well as wear and erosion of the sealing surfaces of the gate members. It is desirable therefore, to provide an expanding gate valve mechanism that will readily become collapsed upon initial opening movement of the gate mechanism, thus minimizing the seat and sealing surface wear and erosion that might otherwise occur.

A problem that exists with most conventional expanding gate valves is the potential for back-wedging or premature wedging. This is the occurrence of mechanical wedging and gate expansion before the gate members have reached their completely closed positions. As the gate assembly of an expanding gate valve is moving toward its closed position, the force of fluid pressure acting on the gate mechanism can develop sufficient drag or resistance on the gate members that cause relative gate movement, resulting in mechanical gate expansion before the gate mechanism has reached its closed position between the valve seats. When premature wedging of the gate and gate expansion mechanism occurs the gate mechanism will experience significant drag, resulting in resistance of the gate closing and sealing activity. This premature gate expansion develops enhanced drag or resistance to gate movement, which increases the gate expansion force, and oftentimes causes the gate mechanism to become stalled or locked before reaching its closed position so that it cannot be completely closed. Obviously, the frictional resistance of premature expansion of an expanding gate mechanism causes significant wear of the gate and seat surfaces of the valve, adding significantly to the maintenance costs of the valves. Premature wedging can occur when flow is in the non-preferred direction which is possible in many valve applications. Back-wedging of expanding gate valves is conventionally prevented by lever mechanisms as shown in U.S. Pat. No. 5,743,288 of Mosman et al, cams as shown in U.S. Pat. No. 6,164,622 of Partridge, springs, as shown in U.S. Pat. No. 2,148,628 of Laurent or combinations of these features.

Undesirable back-wedging or premature wedging activity during valve closing is prevented by the present invention because both gate members are supported by the valve stem during both opening and closing movement of the expanding gate mechanism. The wedge member has no external forces acting on it due to pressure or operation. Force is only applied to the wedge member when the wedge is moved into contact with the stop and the gate members are moved relative to the wedge member by the valve stem. The expanding gate mechanism is virtually at its closed position when the wedge member comes into contact with the gate stop. And when the wedge member of the preferred embodiment has become stopped the gate forces act in substantially equally balanced manner on the tapered surfaces of the wedge member.

An advantage of moving gate members laterally into sealing engagement with seat surfaces is that the gate members do not tend to drag or slide along the seat surfaces with high friction engagement and thus the gate and seat surfaces within the valve are not subjected to excessive wear during opening and closing movement of the expanding gate mechanism. Consequently the sealing surfaces of the valve seats and gate members do not tend to become rapidly worn or eroded during frequent valve operation under high pressure conditions.

SUMMARY OF THE INVENTION

It is a principal feature of the present invention to provide a novel expanding gate valve mechanism having a pair of gate members that are sequentially moved during opening movement of the gate valve mechanism, to minimize the valve actuator force that is required for such opening movement.

It is another feature of the present invention to provide a novel expanding gate valve mechanism having a lost motion connection with the valve stem of a valve actuator, causing opening movement of the upstream gate member to be initiated prior to initiation of the opening movement of the downstream gate member.

It is also a feature of the present invention to provide a novel expanding gate valve mechanism that is not subject to back-wedging or premature wedging during closing movement of the expanding gate mechanism thereof.

Other and further objects and features of the present invention will become evident upon an understanding of the principles of the present invention as set forth in detail herein.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments. In the Drawings.

DETAILED DESCRIPTION OF PREFERRED EMBODIMENT

Figure 1:
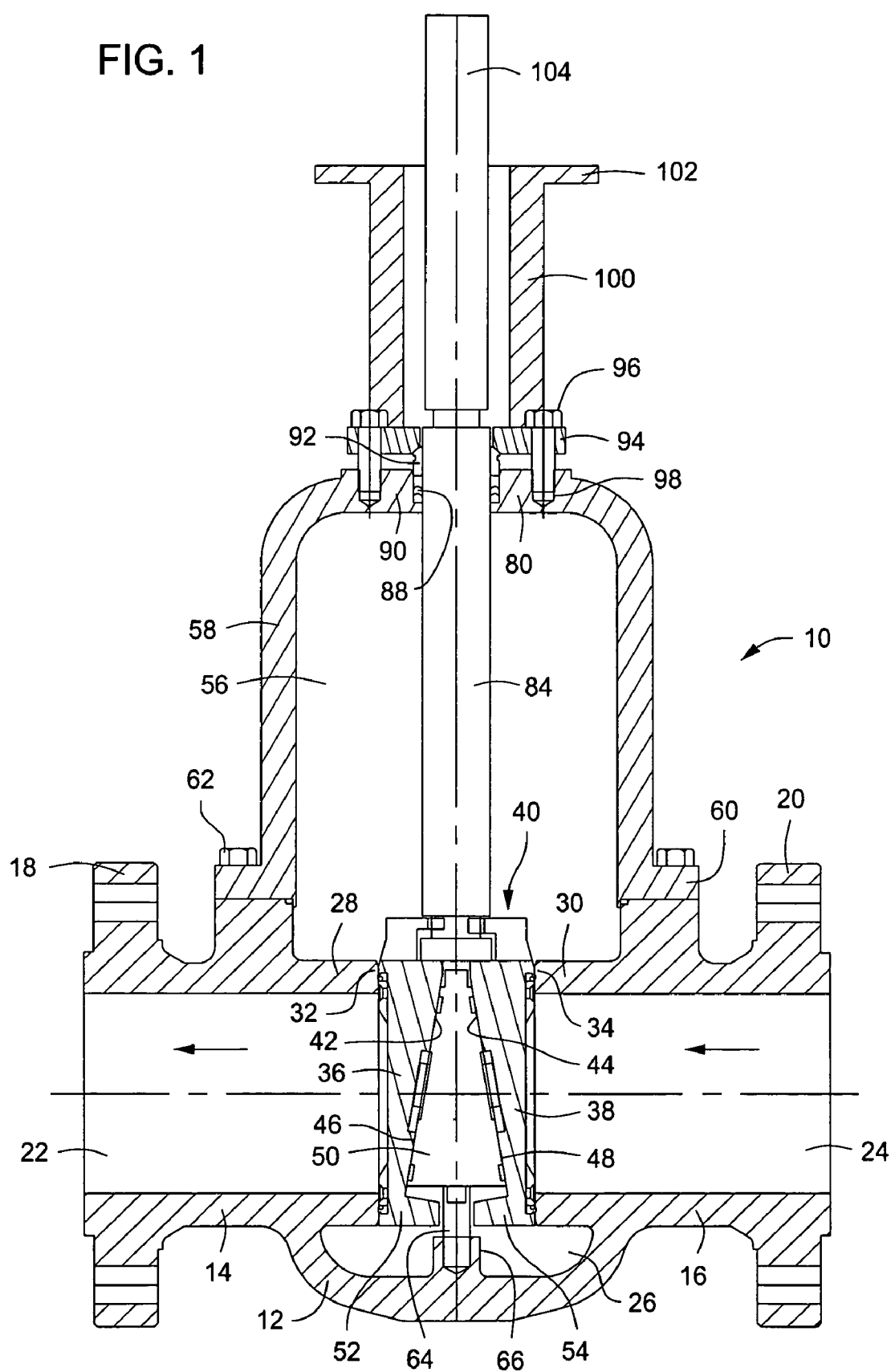
FIG. 1 is a sectional view showing an expanding gate valve mechanism representing the preferred embodiment of the present invention, with the expanding gate mechanism thereof being shown in its closed position.

Referring now to the drawings and first to FIGS. 1-4, an expanding gate valve mechanism representing the preferred embodiment of the present invention is shown generally at 10 in FIG. 1 and comprises a valve body 12 having tubular connection members 14 and 16 each being provided with connection flanges 18 and 20 or other suitable means for connecting the valve mechanism into a flow line. The tubular connection members and connection flanges define internal flow passages 22 and 24 each communicating with a valve chamber 26 defined by the valve body 12 and communicating with a flow line, not shown, within which the valve mechanism is connected. Tubular conduit portions 28 and 30 of the valve body 12 define spaced, parallel annular seat or sealing surfaces 32 and 34 that are disposed for sealing engagement with gate members 36 and 38 of an expanding gate mechanism shown generally at 40. The flow of fluid through the aligned flow passages 22 and 24 is preferably in the direction of the flow arrows shown in FIG. 1, thus causing gate member 38 to be an upstream gate, while gate member 36 serves as the downstream gate of the expanding gate mechanism. However, it is not intended to limit the spirit and scope of the present invention to expanding gate valves that are designed only for unidirectional flow characteristics.

Expansion movement of the expanding gate valve mechanism 40 is accomplished during closing movement of the gate members 36 and 38 by reaction of tapered gate expansion surfaces 42 and 44 of the gate members relative to oppositely tapered and oppositely facing gate expansion surfaces 46 and 48 of a wedge member 50. The gate members 36 and 38 are provided with lower lateral projections 52 and 54 that extend below the lower surface portion of the wedge member 50 and ensure that the wedge member is both captured and freely moveable between the gate members even when the expanding gate mechanism 40 has been moved to a position within an upper valve chamber portion 56 of the valve chamber. The upper valve chamber portion 56 is defined by a bonnet member 58 that is secured and sealed to the valve body 12 by a flange connection 60 that is secured by retainer bolts 62 or other suitable means for bonnet retention.

A wedge stop member 64, such as a stop pin, is secured to a stop mounting boss 66 that projects into the valve chamber 26 from the bottom wall of the valve body 12. The wedge stop member 64 is positioned for stopping engagement with the lower surface of the wedge member 50 as the gate members 36 and 38 are moved downwardly to its closed position as shown in FIG. 1. When further downward movement of the wedge member 50 has been stopped by the wedge stop member 64, further downward movement of the gate members 36 and 38 cause the tapered surfaces 42 and 44 of the gate members to interact with the opposed tapered surfaces 46 and 48 of the wedge member 50. This further downward opening movement of the gate members 36 and 38 develop laterally oriented forces on the gate members that forcibly move the gate members laterally into tight sealing engagement with the respective spaced, parallel annular seat or sealing surfaces 32 and 34 with very little linear sliding movement. This feature minimizes wear of the seat and sealing surfaces of the gate members and the seat surfaces within the valve body.

Figure 2:
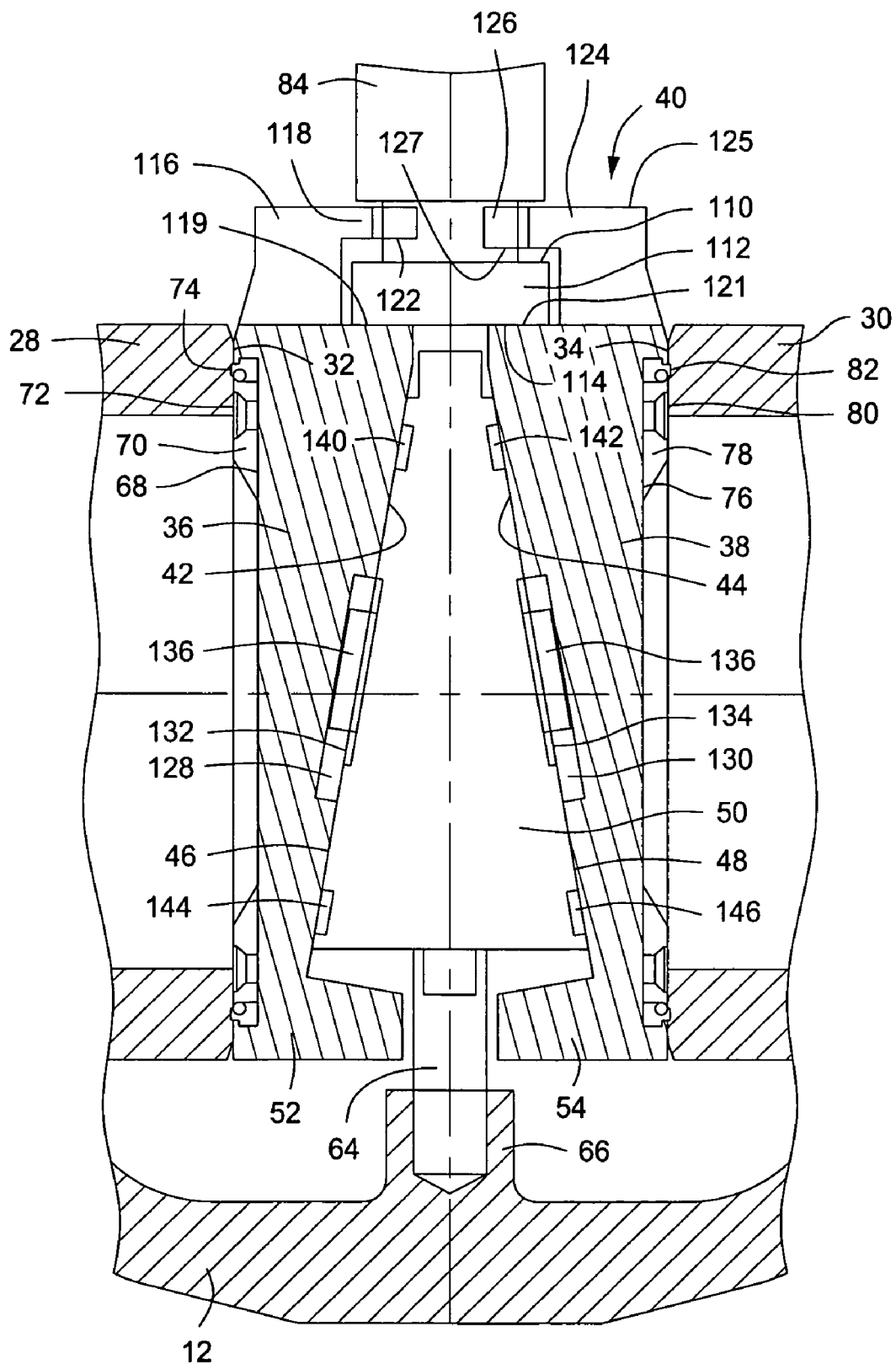
FIG. 2 is a fragmentary sectional view of the central portion of the expanding gate valve mechanism of FIG. 1 showing the expanding gate mechanism in its closed and sealed condition and further illustrating the detailed geometry of the gates, stem connection and expansion wedge.
Figure 3:
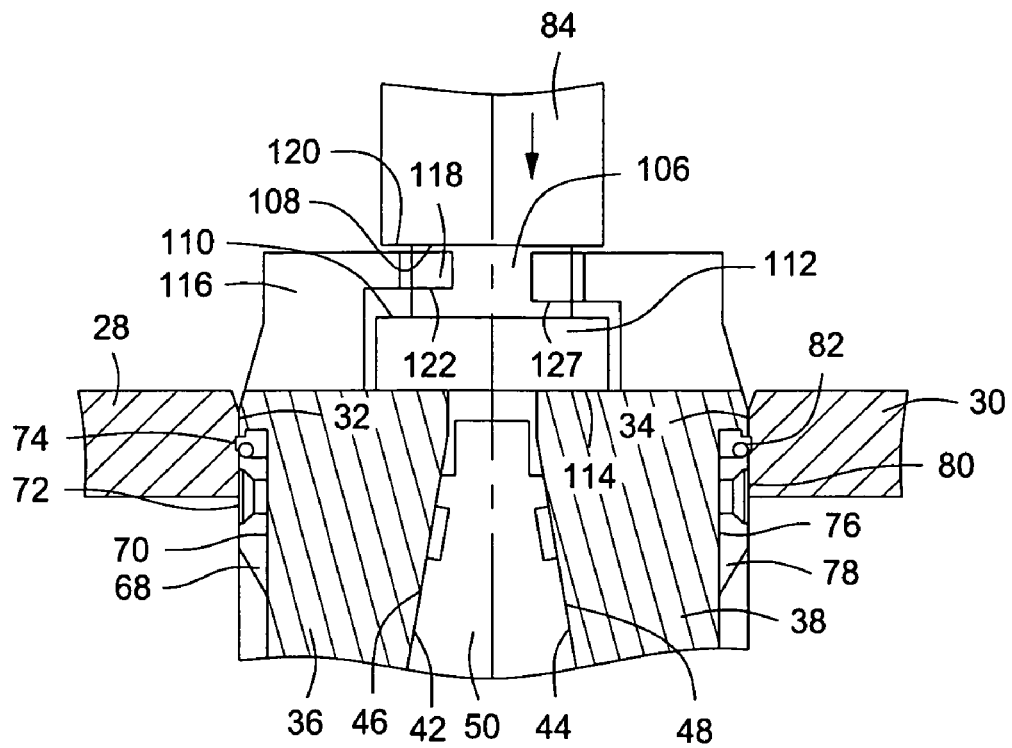
FIG. 3 is a fragmentary sectional view of portions of the valve stem and expanding gate mechanism, illustrating the closed and sealed condition of the valve mechanism upon downward movement of the valve stem as evidenced by a movement arrow.
Figure 4:
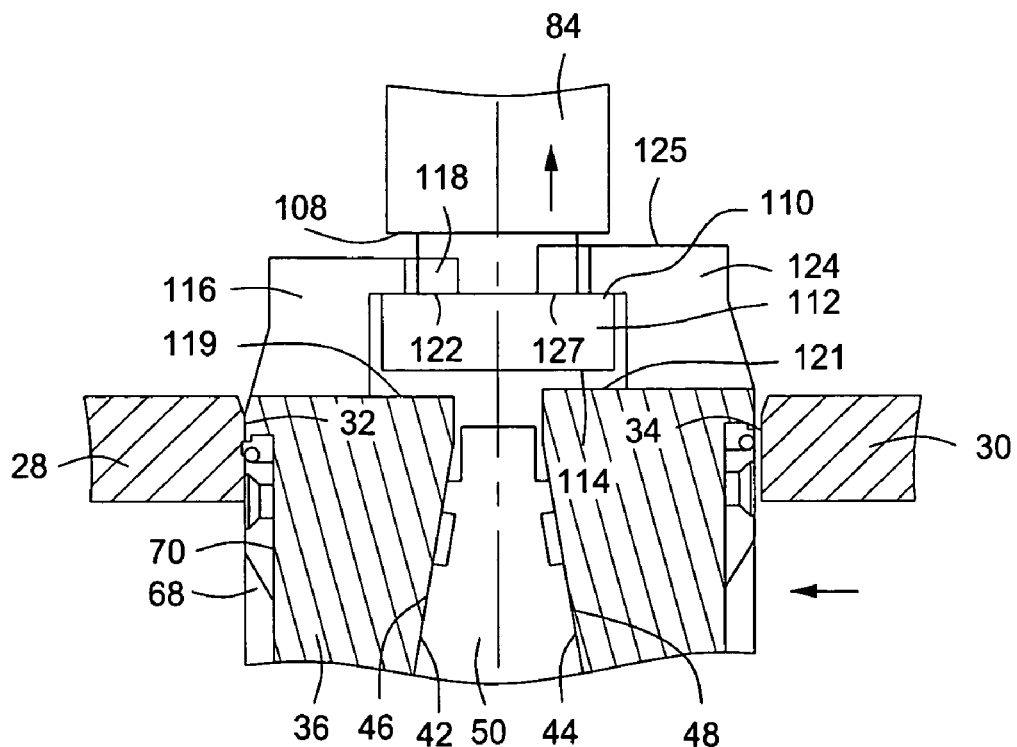
FIG. 4 is also a fragmentary sectional view of portions of the valve stem and expanding gate mechanism similar to that of FIG. 3, but illustrating initial upward opening movement of the upstream gate member by upward valve stem movement as evidenced by a movement arrow.
Figure 6:
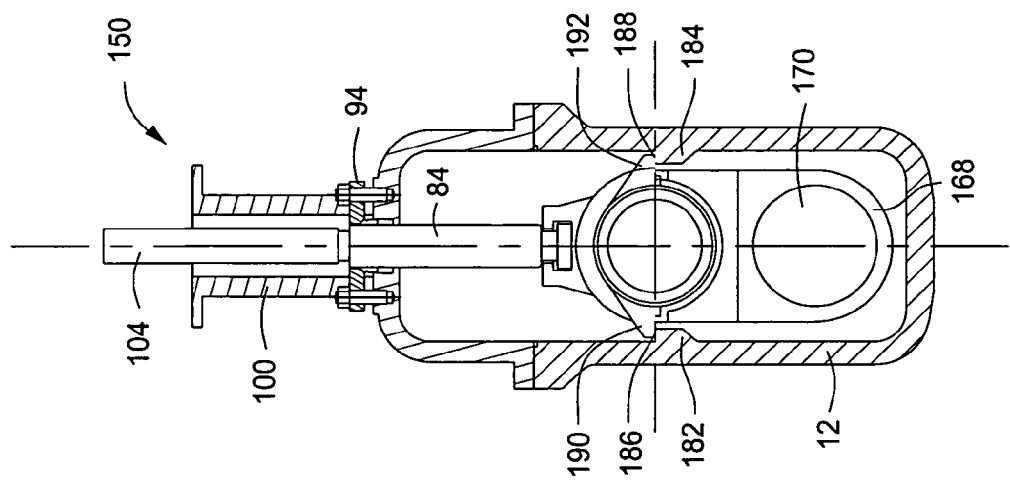
FIG. 6 is a sectional view taken along line 6-6 of FIG. 5.
Figure 5:
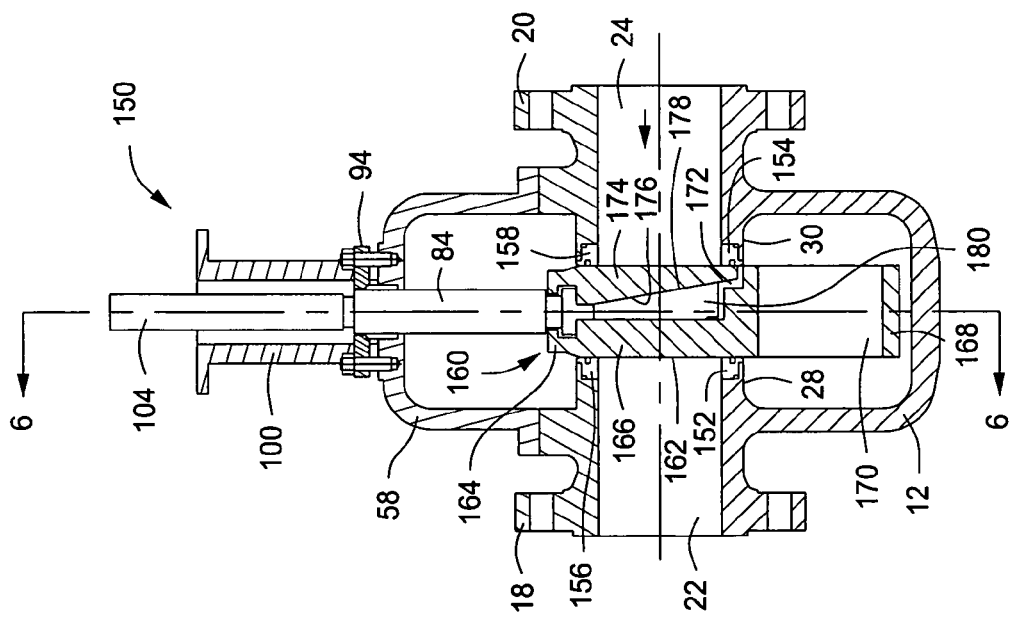
FIG. 5 is a sectional view of an expanding gate valve mechanism representing an alternative embodiment of the present invention, being shown in the closed position.

As is more clearly evident in the fragmentary sectional views of FIGS. 2-4, the gate members 36 and 38 each have replaceable seal assemblies. The downstream gate member 36 defines a seal recess 68 having a seal retainer 70 secured therein by retainer screws 72 or the like and serving to secure a seal member 74 in sealing position for sealing engagement with the annular sealing surface 32. The upstream gate member 38 defines a seal recess 76 having a seal retainer 78 retained therein by a retainer screw 80 or the like and securing a sealing member 82 in position for sealing engagement with the annular seat surface 34. It is not intended to restrict the spirit and scope of the present invention to expanding gate mechanisms that support seal members as described above. If desired, the gate members may define planar sealing surfaces that engage with seat assemblies that are retained in spaced relation within the valve body. In fact, this alternative feature is shown in FIGS. 5 and 6 which are described in detail below.

A valve stem member 84 extends upwardly through the upper valve chamber portion 56 of the valve chamber 26, also referred to herein as the bonnet chamber, and has sealing engagement with a stem packing assembly 86 that is located within a packing chamber 88 of the upper wall structure 90 of the bonnet member 58. The packing assembly 86 is secured within the packing chamber 88 by means of a packing retainer 92 that is in turn secured in place by a retainer plate 94. Retainer bolt members 96 extend through holes of the retainer plate 94 and are received by threaded openings 98 in the upper wall structure 90 of the bonnet member 58. The retainer plate 94 may be an independent element or may be an integral retainer plate component of a tubular actuator mounting member or yoke 100 having a mounting plate 102 to which is mounted a power energized mechanical, pneumatic, electrical or hydraulic valve actuator, not shown. The upper portion 104 of the valve stem 84 may be externally threaded and the valve actuator may incorporate a rotary drive mechanism rotating a drive nut and achieving linear opening and closing movement of the valve stem. If the valve actuator is designed for direct linear movement such as in the case of pneumatic or hydraulic valve actuators the upper portion of the valve stem may have direct connection to a linear moveable actuator stem.

The valve stem 84, at its lower end portion, defines a reduced diameter section forming an annular stem groove 106 which is defined by the reduced diameter section and by upper and lower stem shoulders 108 and 110. The annular stem groove 106 also defines a lower stem section 112 having a circular bottom surface 114. The downstream gate member 36 has a stem connection projection 116 which defines a laterally extending stem engagement member 118 having a thickness that is significantly less than the width of the annular stem groove 106 and defines top and bottom shoulder surfaces 120 and 122. The downstream gate member 36 defines a shoulder surface 119 and the upstream gate member 38 defines a shoulder surface 121. The upstream gate member 38 has a stem connection projection 124 defining a laterally extending stem engagement member 126 having a greater thickness as compared with the thickness of the laterally extending stem engagement member 118, which thickness is slightly less than the width of the annular stem groove 106 so that the laterally extending stem engagement member 118 is readily received within the annular stem groove 106. The laterally extending stem engagement member 126 defines upper and lower shoulder surfaces 125 and 127 that are positioned opposite the valve stem shoulder surfaces 108 and 110. It is important to note that both of the gate members have driven connection with the valve stem during both opening and closing movement. This feature effectively prevents the problem of back-wedging that is prevalent in conventional expanding gate valve designs.

As the valve stem 84 is moved downwardly, during closing valve movement as shown in FIG. 3, the laterally extending stem engagement members 118 and 129 of the stem connection projections 116 and 124 will be located within the annular stem groove 106. The lower shoulder surface 114 of the lower stem section 112 will bear equally on the upwardly facing shoulders 119 and 121 of the gate members 36 and 38. Thus, downward valve closing movement of the valve stem causes corresponding downward movement of both of the gate members. The gate members are moved downwardly together, toward their valve closed positions since both the upstream and downstream gate members are driven downwardly by the valve stem. The free floating wedge member 50, being captured between the gate members, will be moved downwardly along with the upstream and downstream gate members until the lower end surface of the wedge member comes into stopped engagement with the wedge stop member 64. Thereafter, continued downward closing movement of the valve stem and the gate members relative to the wedge member causes the tapered surfaces 42 and 44 of the gate members to react with the opposed tapered surfaces 46 and 48 of the wedge member 50. This tapered surface reaction imparts lateral force to the gate members, moving them laterally apart and into engagement with the annular sealing surfaces 32 and 34 within the valve body. This gate expansion movement forces the gate members into tight sealing engagement with the annular sealing surfaces within the valve body.

For opening of the expanding gate valve mechanism 10 a valve actuator will be energized, causing upward movement of the valve stem 84 as shown by the movement arrow in FIG. 4. During the initial stage of upward valve stem movement the lower stem shoulder 110, also referred to as a gate lifting shoulder, will move into engagement with the lower shoulder surface 127 of the laterally extending stem engagement member 126. At this point neither the upstream nor downstream gate member will have been moved upwardly from the closed and sealed positions thereof. Further upward movement of the valve stem 84 from this initial valve opening condition will cause slight upward movement of the upstream gate member 38 from its closed and sealed position, releasing the gate expansion force of the interacting tapered surfaces 48 and 44. At this point the lower stem shoulder will have been moved upwardly into engagement or close proximity with the downwardly facing bottom shoulder surface 122 of the laterally extending stem engagement member 118 but will not have lifted the downstream gate member from its closed and sealed position. Since the valve mechanism will typically be under pressure by the fluid within the upstream flow passage 24 the upstream gate member 38 will be moved downstream by the force of the fluid pressure, breaking its seal with the annular sealing surface 34. When this condition has occurred the fluid pressure within the valve chamber 26 will have become equalized with line pressure. Further opening movement of the upstream gate member under this equalized pressure condition will require only minimal opening force, since gate drag with respect to the upstream seat surface 34 has been minimized or eliminated. This feature also minimizes any wear or erosion that might otherwise occur with respect to the sealing assemblies and the sealing surfaces of the gate members. According to the above discussion it is clear that the upstream gate member 38 has been moved by the valve stem sufficiently to break its seal with the upstream seat member, but the downstream gate member will have remained at its closed and sealed condition with respect to the downstream seat of the valve body. When the upstream gate member has been moved in this manner the pressure within the valve chamber will have become balanced with upstream line pressure.

As mentioned above, when the upstream gate member has initially been moved upwardly as described, the downstream gate member will not have been moved from its closed and sealed condition. Further upward valve opening movement of the valve stem from the initial valve opening position of FIG. 4, will cause upward movement of the downstream gate member 36 and further upward movement of the upstream gate member 38 Valve opening movement from the closed position shown in FIGS. 1-3 will require significantly less opening force, permitting a valve actuator of the valve mechanism to be manufactured at less cost as compared with the valve actuators that are typically required for conventional expanding gate valves. This activity is generally referred to as sequential linear gate movement, which occurs due to the interrelated geometry of the valve stem and the upstream and gate members.

It should be borne in mind that the downstream gate member 36 will have maintained its seated and sealed condition with respect to the downstream seat surface 32 within the valve body 12 during initial opening movement of the upstream gate member 38 as explained above. Typically at this point a pressure differential will exist between the valve chamber 26 and the downstream flow passage 22. This pressure differential develops a resultant force acting on the downstream gate member 36 and urging the downstream gate member against the annular downstream seat surface 32, tending to maintain the closed and sealed condition of the downstream gate member with respect to the downstream seat surface 32. To open the valve mechanism and permit the flow of fluid through both of the flow passages 22 and 24 it is only necessary to apply sufficient upward force to the downstream gate member 36 to overcome its sealed and frictional engagement with the downstream seat surface and move the downstream gate member upwardly toward its open condition. And, as fluid flow through the flow passages begins, the differential pressure condition will become more evenly balanced, thus minimizing the valve stem force that is needed for continued upward opening movement of the expanding gate assembly. Since very little force will be needed at this point to continue upward opening movement of the upstream gate member 38, the only significant force requirement will be for moving the downstream gate member. Thus, the total force requirement for unseating and moving the expanding gate mechanism 40 from its closed and sealed condition, shown in FIGS. 1-3, because of the sequential opening movement of the upstream gate member 48 and the downstream gate member 36, is significantly minimized.

With reference particularly to FIGS. 1 and 2, it is desirable that the gate members 36 and 38 remain aligned during opening and closing movement of the expanding gate valve mechanism. To accomplish this feature the gate members define elongate recesses or spline slots 128 and 130, best seen in FIG. 2, and the wedge member 50 defines corresponding elongate recesses or spline slots 132 and 134. Spline members 136 and 138 are engaged within the respective elongate recesses or spline slots of the gate members and the wedge member and ensure that the free floating wedge member maintains proper alignment with the gate members regardless of the position of the expanding gate mechanism 40 within the valve chamber 26 of the valve body 12. If desired, the spline members 136 and 138 may be fixed within the elongate recesses or spline slots of either the gate members or the wedge member and linearly moveable within the opposite elongate recesses or spline slots so that aligned linear movement of the gate members and the wedge member can readily occur during valve opening and closing movement. This feature ensures that the gate members and the wedge member will be properly aligned with one another as the gate members are moved to the closed and sealed conditions thereof within the valve chamber of the valve body. This alignment feature ensures that the wedge member cannot inadvertently move to a position that interferes with the closing movement of the valve mechanism.

Additionally, the wedge member 50 defines upper seal recesses 140 and 142 and lower seal recesses 144 and 146 that each contain sealing elements to ensure sealing engagement of the tapered surfaces 42 and 44 of the gate members 36 and 38 with respect to the corresponding tapered surfaces 46 and 48 of the wedge member 50 at the closed and sealed condition of the expanding gate mechanism 40 within the valve chamber.

While expanding gate valves embodying the principles of the present invention are preferably constructed according to the features that are described above in connection with FIGS. 1-4, it is not intended to restrict the spirit and scope of the present invention solely to the preferred embodiment of FIGS. 1-4. With reference to FIGS. 5 and 6 an expanding gate valve mechanism is shown generally at 150. The expanding gate valve mechanism 150 incorporates many of the features of FIGS. 1-4, thus like parts are identified by like reference numerals. The tubular conduit portions 28 and 30 within the valve body 12 define seat recesses 152 and 154 within which are received annular seal rings or seat assemblies 156 and 158 each presenting face sealing portions for sealing engagement with an expanding gate mechanism shown generally at 160.

The expanding gate mechanism 160 incorporates a downstream gate member 162 having an upper portion defining a laterally extending stem engagement member 164, essentially corresponding with the stem connection and stem engagement member 116 and 118 of FIG. 2. The gate member 162 is shown in its closed position with a non-ported section 166 thereof having sealing engagement with the downstream seal assembly 156 and blocking the flow of fluid through the valve mechanism. The gate member 162 defines an integral ported section 168 having a flow port 170 which defines through port registry with the seal assemblies 156 and 158 when the gate member is moved upwardly to its open position by upward valve opening movement of the valve stem 84.

For purposes of gate expansion the gate member 162 defines a gate recess 172 within which is received a gate expansion member 174 which is also non-ported and is disposed for expansion into tight sealing engagement with the upstream seal assembly 158 as shown in FIG. 5. The gate expansion member 174 defines a tapered gate expansion surface 176 that is disposed in engagement with a corresponding tapered gate expansion surface 178 of a wedge member 180. The opposite face or surface of the wedge member 180 is of planar configuration and is disposed in supported engagement with a corresponding planar wall surface of the gate recess 172.

To accomplish relative movement of the gate member 166 and the gate expansion member 174, as shown in FIG. 6 the valve body 12 defines internal bosses 182 and 184 defining internal stop shoulders 186 and 188. The wedge member 180 has outwardly extending stop members 190 and 192 that engage with and are stopped by the internal stop shoulders 186 and 188 of the valve body before the gate member and the gate expansion member have been moved downwardly to their full extent. When downward movement of the wedge member has been stopped by the stop shoulders the lower end surface of the valve stem 84, bearing against an upwardly facing shoulder of the gate expansion member 174, will ensure that the gate expansion member has also been moved downward to its valve closing position. This downward movement of the gate expansion member 174 causes interaction of the tapered surfaces 176 and 178, resulting in lateral expansion movement of the gate expansion member 174, thus forcing the gate expansion section tightly against the upstream seal assembly 158.

The same lost-motion stem/gate connection exists with respect to the gate and gate expansion section as is shown in FIGS. 1-4. This feature causes upward movement of the valve stem 84 to cause sequential initial opening movement of the gate expansion member 174 and the gate member 166 as is described above. Upward opening movement of the valve stem 84 will cause an initial increment of upward movement of the gate expansion member, while the gate member remains static at its seated and sealed position. This initial increment of upward movement of the gate expansion member 174 releases the gate expansion force and permits lateral collapsing movement of the gate expansion member. As soon as this condition has occurred, the gate expansion member will be moved slightly downstream by the fluid pressure of the upstream flow passage, thus separating the planar sealing surface of the gate expansion member from the upstream seal assembly and permitting valve chamber pressure to become balanced with upstream line pressure. Further upward movement of the valve stem 84 will then move both the gate member 166 and the gate expansion member 174 upwardly until the flow port 170 of the gate member has been moved into flow-through registry with the flow passages 22 and 24. This flow-through or full opening condition of the expanding gate mechanism permits pigs, line scrapers and other devices to pass through the valve mechanism. After gate collapse has occurred upward movement of the expanding gate mechanism will not have high friction engagement with the upstream valve seat during further opening movement.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. An expanding gate valve mechanism, comprising:
    a valve body defining a valve chamber and flow passages intersecting said valve chamber and having spaced sealing surfaces;
        first and second gate members being moveable within said valve body between an open position permitting flow of fluid through said flow passages and a closed position blocking the flow of fluid through said flow passages, at said closed position said first and second gate members having sealing engagement with said spaced sealing surfaces;
        a wedge member being disposed between said first and second gate members and having interacting tapered surface engagement with at least one of said first and second gate members and imparting lateral gate expansion force to at least one of said first and second gate members and developing tight sealing engagement of said first and second gate members with said spaced sealing surfaces;
    a valve stem being linearly moveable to valve opening and closing positions within said valve body and having driving connection with said first and second gate members, upon initial linear opening movement said valve stem causing sequential opening movement of said second gate member prior to initial opening movement of said first gate member;
    said wedge member being movably disposed between said first and second gate members and being moveable with said first and second gate members during opening and closing movement of said gate valve mechanism; and
    a stop member being located within said valve body and being positioned to stop linear closing movement of said wedge member; and continued closing movement of said first and second gate members by said valve stem relative to said wedge member causing expansion movement of at least one of said first and second gate members by said interacting tapered surface engagement and forcing said first and second gate members into tight sealing engagement with said spaced sealing surfaces.

2. The expanding gate valve mechanism of claim 1, comprising:
    a gate lifting shoulder being defined by said valve stem;
    laterally extending stem engagement members of said first and second gate members each being positioned in lifting relation with said gate lifting shoulder; and
    when said first and second gate members are located at closed positions, said laterally extending stem engagement members having different positions with respect to said gate lifting shoulder and are sequentially engaged by linear lifting movement of said valve stem and cause sequential linear movement of said first and second gate members from said closed positions toward said open positions.

3. The expanding gate valve mechanism of claim 1, comprising:
    said valve stem having a lower end portion defining an annular groove having a gate opening shoulder; and
    laterally extending stem engagement members of said first and second gate members each projecting into said annular groove and being positioned in lifting relation with said gate opening shoulder, said laterally extending stem engagement members having different spaced relation with said gate opening shoulder and upon linear opening movement of said valve stem a laterally extending stem engagement member of said second gate member being moved by said gate lifting shoulder prior to movement of said laterally extending stem engagement member of said first gate member.

4. The expanding gate valve mechanism of claim 1, comprising:
    said first and second gate members each defining a tapered gate expansion surface; and
    said wedge member defining oppositely facing tapered gate expansion surfaces each having engagement with said tapered gate expansion surfaces of said first and second gate members.

5. The expanding gate valve mechanism of claim 1, comprising:
    opposed shoulder surfaces being defined by said valve stem and defining an annular stem groove;
    one of said opposed shoulder surfaces defining a lifting shoulder;
    first and second stem connection members extending respectively from said first and second gate members into said annular stem groove and having different spacing from said lifting shoulder; and
    initial opening movement of said expanding gate mechanism causing sequential initial opening movement of said second gate member prior to opening movement of said first gate member and releasing said lateral expansion force and permitting collapsing movement of said expanding gate mechanism.

6. The expanding gate valve mechanism of claim 1, comprising:
    alignment members having aligning engagement with said first and second gate members and said wedge member and maintaining a predetermined aligned relationship of said first and second gate members with said wedge member during opening and closing movement of said expanding gate mechanism by said valve stem.

7. A method for achieving mechanically energized sealing, opening and closing movement of an expanding gate valve mechanism having a valve body defining a valve chamber and flow passages communicating with said valve chamber and having spaced sealing surfaces within said valve chamber and further having first and second gate members having tapered reaction engagement with tapered surfaces of a wedge member disposed between said first and second gate member and a valve stem disposed in driving relation with said first and second gate members, said method comprising:

moving said first and second gate members and said wedge member linearly toward a valve closed position between said spaced sealing surfaces;

stopping linear valve closing movement of said wedge member prior to said first and second gate members reaching said valve closed positions thereof;

moving said first and second gate members linearly relative to said wedge member, causing forcible gate expansion interaction of said tapered surfaces and achieving forcible sealing engagement of said first and second gate members with said spaced sealing surfaces;

moving said valve stem linearly from said valve closed position toward a valve open position; during an initial stage of valve opening movement of said valve stem imparting an opening force to said second gate member with said first gate member in static position and causing an increment of opening movement of said second gate member toward said open position, said increment of opening movement releasing said forcible gate expansion interaction of said tapered surfaces and permitting relative collapsing movement of said first and second gate members; and after said initial stage of valve opening movement of said valve stem imparting opening forces to said first and second gate members and moving said first and second gate members and said wedge member to a valve open position.

8. The method of claim 7, comprising:

maintaining predetermined alignment of said first and second gate members with said wedge member during opening and closing movement thereof within said valve body.

* * * * *